REPEATER ALARM SYSTEM FOR INDICATING FAILURE OF AN AMPLIFIER
Filed April 17, 1962
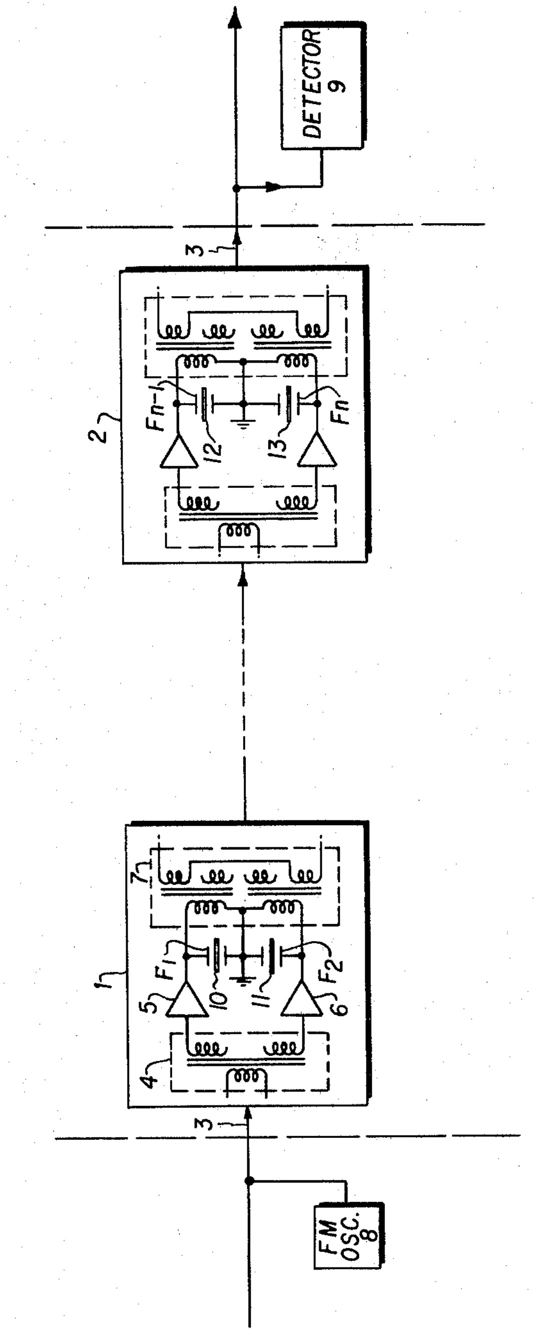
INVENTOR.
Anthony E. Lofting
BY
C. A. Gulbrandsen
Atty.

3,210,671
Patented Oct. 5, 1965

3,210,671

REPEATER ALARM SYSTEM FOR INDICATING FAILURE OF AN AMPLIFIER

Anthony E. Lofting, Woodside, Calif., assignor, by mesne assignments, to Automatic Electric Laboratories, Inc., Northlake, Ill., a corporation of Delaware Filed Apr. 17, 1962, Ser. No. 188,205
3 Claims. (Cl. 330—2)

This invention relates to alarm systems and more particularly repeater alarm systems for communications repeaters.

In the design of highly reliable repeater communication systems it is often advantageous to provide an arrangement of two amplifiers in each repeater connected in parallel in such a way that failure of one amplifier will not cause a change in output level of the combined amplifiers. However, without a change in output level it is difficult to determine when, or if, one of the amplifiers has actually failed.

Therefore it is an object of this invention to provide positive identification of amplifier failure in a highly reliable multirepeater comunication system using parallel amplifiers.

In the past in order to provide highly reliable communication circuits two separate signal paths were used. In case one of the signal paths failed the other was switched into operation by means of an alarm system. The failure of one channel was sensed by the alarm system which then switched the other channel into operation. Such systems, while providing the desired protection, required duplicate transmission facilities which increased the cost abnormally and generally involved switching mechanisms causing a discontinuity in signal transmission. According to the present invention, duplicate transmission facilities are not required since parallel amplifiers are used in each repeater station. There is no discontinuity in signal transmission from one amplifier to the other.

According to the present invention, a resonant circuit which may be a crystal is placed across the output of each of the parallel amplifiers in each repeater. Each of the circuits placed across the output of the amplifiers has its own distinct resonant frequency. Thus, in any single repeater, each amplifier has a resonant circuit across its output, and each resonant circuit has a resonant frequency distinct from every other resonant circuit used. When a signal at the resonant frequency of one of these resonant circuits is applied to the parallel amplifiers it will pass through one of the amplifiers and be transmitted to the next station, but as it passes through the amplifier whose output has a circuit resonant at the frequency of the input signal, the signal will be shorted to ground, and there will be no output from this amplifier at the resonant frequency. By using the proper detecting means at the output of said repeater, it can be determined whether or not said resonant frequency passed through the repeater and thus whether or not the amplifier whose output circuit was not resonant at said frequency is operating properly. If, in a repeater having two parallel amplifiers, a circuit resonant at frequency F is placed across the output of the first amplifier and a circuit resonant at frequency F′ is placed across the output of said second amplifier and a signal of frequency F is applied to the repeater, the only way said frequency F can appear at the output of said repeater is if said second amplifier is operating properly. The frequency F would be shorted to ground at the output of said first amplifier and therefore could only reach the output of said repeater through said second amplifier. Further according to this invention many repeaters may be operated in series. Each repeater having two parallel amplifiers and each amplifier having a circuit of distinct resonant frequency placed across its output. It is then possible according to this invention to determine when any of the amplifiers has failed despite the fact that the signal level has not changed. A better understanding of this invention will be had by referring to the following figure and description. The figure is a schematic representation of a repeater transmission system including the features of the present invention.

Referring to the figure, repeaters 1 and 2, are the first and last repeaters respectively on a repeatered transmission line, 3. Repeater 1 comprises input circuit 4, parallel amplifiers 5 and 6, crystals 10 and 11 resonant at frequencies F1 and F2 respectively and output circuit 7. Crystals 10 and 11 are connected respectively across amplifiers 5 and 6 to ground. These crystals may be resonant at frequencies outside the normal transmission range. Note that the amplifiers are arranged in parallel so that the output is continuous even if one of the amplifiers should fail. According to the present invention the crystals 10 and 11 are placed across the outputs of the amplifiers not in the feedback path so that even under normal transmission conditions when both amplifiiers are operating properly a signal of frequency F1 or F2 for example would be depressed 3 db because of the crystal resonant circuit. If amplifier 6 of repeater 1 were to fail there would be no output at frequency F1.

Frequency modulation oscillator 8 is a source of test signals which may be applied to one end of the transmission line and detector 9 is a means of detecting particular frequencies which appear at the other end of the transmission line. Instead of using an FM oscillator 8 which varies at a periodic rate over all of the frequencies needed for testing the amplifiers of a particular transmission system, a number of fixed tones may be used corresponding to the resonant frequencies of the crystals appearing across the outputs of the various amplifiers in the transmission system. In either case the detector 9 will be used to determine whether or not a particular frequency has passed through the transmission system and thus whether or not all the ampifiers are operating properly.

As an example of system operation, suppose that a tone of frequency F1 is applied to transmission line 3 by oscillator 8 and further suppose that amplifiers 5 and 6 of repeater 1 are operating properly. In this case the tone signal at frequency F1 will be applied to both amplifiers 5 and 6 and will appear at the output of each of said amplifiers. But since the resonant circuit to ground across the output of amplifier 5 is resonant at frequency F1 it will appear as a short circuit to this tone signal and essentially no voltage at frequency F1 will be applied to the output circuit 7 from amplifier 5. However the tone signal at frequency F1 appearing at the output of amplifier 6 will be applied to the output circuit and transmitted along the transmission line to the next repeater. Assuming that each of the remaining repeaters on the transmission line has at least one amplifier operating properly the tone signal at frequency F1 will be detected by detector 9 at the end of the transmission line thereby indicating that amplifier 6 of repeater 1 is operating properly. Note that the signal at frequency F1 will appear at the detector down 3 db from the normal signal level of the transmission line but this is to be expected since the outputs of amplifier 5 and 6 are additive across the output circuit 7 of repeater 1 and since the output of amplifier 5 makes no contribution to the signal applied to the output circuit 7 the signal at F1 is transmitted from the output of repeater 1 down 3 db and remains so throughout the rest of the amplifiers. If amplifier 6 of repeater 1 were not operating properly, that is if it had failed, there could be no output at detector 9 corresponding to frequency F1 because amplifier 6 is the only path through repeater 1 for signals at frequency F1.

Repeater 2 on transmission line 3 is the same as repeater 1 with the exception that the crystals 12 and 13 across the amplifier outputs are resonant at frequencies F3 and F4 respectively. Thus, a signal from oscillator 8 at frequency F3 will pass through repeater 1 at the normal signal level on the transmission line. But since it has only one path through repeater 2 even though both amplifiers of repeater 2 are operating properly it will appear at the output of repeater 2 down 3 db. If amplifier 5 of repeater 2 has failed the signal at frequency F3 will not appear at all at detector 9 thereby indicating that amplifier 5 of repeater 2 has failed.

While I have described the present invention with respect to a particular embodiment this description is intended in no way to limit the scope of the present invention.

What is claimed is:

1. In a communication system with a signal transmission medium including first and second amplifying means connected in parallel between input and output circuits so that the output is continuous irrespective of the failure of one of said amplifying means, a testing arrangement comprising:

circuit connections to said input circuit for coupling thereto test signals of a first and a second test frequency;

a first resonant circuit connected to the output of said first amplifying means and tuned to said first test frequency so as to pass all signals except those of said first test frequency from said first amplifying means to said output circuit;

a second resonant circuit connected to the output of said second amplifying means and tuned to said second test frequency so as to pass all signals except those of said second test frequency from said second amplifying means to said output circuit; and means connected to said output circuit for detecting the presence and absence of said test signals of a first and a second test frequency, for indicating failure of said first amplifying means when presence of signals of said first test frequency and absence of signals of said second test frequency is detected, and for indicating failure of said second amplifying means when presence of signals of said second test frequency and absence of signals of said first test frequency is detected.

2. A communication system as claimed in claim 1, wherein said first and second resonant circuits include, respectively, a crystal resonant at said first test frequency and a crystal resonant at said second test frequency.

3. In a communication system comprising a signal transmission medium with an input end, an output end, and a plurality of repeaters interposed in series at intervals between said input end and said output end, each repeater including a pair of amplifying means connected in parallel between the input and output circuits thereof so that the output of said repeater is continuous irrespective of the failure of one of the said amplifying means included therein, a testing arrangement comprising:

circuit connections to said input end of said signal transmission medium for coupling thereto a plurality of test signals of discrete test frequencies, each test signal of a particular test frequency associated with a particular amplifying means in a particular repeater;

a resonant circuit connected to the output of each of said amplifying means in said repeaters and tuned to the particular test frequency associated with that particular amplifying means of that particular repeater so as to pass all signals except those of said particular test frequency from said particular amplifying means to said output circuit of said particular repeater; and means connected to said output end of said signal transmission medium for detecting the absence of said test signals of discrete test frequencies and for indicating failure of a particular amplifying means in a particular repeater when absence of the particular test frequency associated with the other amplifying means in said particular repeater is detected.

References Cited by the Examiner

UNITED STATES PATENTS

| | | | |
|---|---|---|---|
| 1,797,746 | 3/31 | Young | 330—126 X |
| 2,935,695 | 5/60 | Wlasuk | 330—126 X |
| 3,060,390 | 10/62 | Brewer | 330—124 X |

FOREIGN PATENTS

| | | |
|---|---|---|
| 465,887 | 5/37 | Great Britain. |

ROY LAKE, *Primary Examiner.*